United States Patent
Caruso

(10) Patent No.: US 6,168,304 B1
(45) Date of Patent: Jan. 2, 2001

(54) LAMP BOX WITH COLOR VARIABLE LIGHT SOURCE

(75) Inventor: Jack Caruso, Orlando, FL (US)

(73) Assignee: Optic-Tech International, Miami, FL (US)

( * ) Notice: Under 35 U.S.C. 154(b), the term of this patent shall be extended for 0 days.

(21) Appl. No.: 09/314,068

(22) Filed: May 19, 1999

(30) Foreign Application Priority Data

May 18, 1999 (CN) .......................................... 99 2 25483.3

(51) Int. Cl.$^7$ .................................. A41F 1/00; F21V 8/00
(52) U.S. Cl. ............................................ 362/581; 384/136
(58) Field of Search ................................... 362/554, 581, 362/551; 385/134, 135, 136

(56) References Cited

U.S. PATENT DOCUMENTS

| | | | |
|---|---|---|---|
| 3,958,114 | * | 5/1976 | Codrino ................................. 362/581 |
| 5,147,128 | * | 9/1992 | Windross .......................... 362/581 X |
| 5,528,714 | * | 6/1996 | Kingstowne et al. ........... 362/581 X |
| 5,793,920 | * | 8/1998 | Wilkins et al. .................... 385/136 X |
| 5,803,575 | * | 9/1998 | Ansems et al. ....................... 362/554 |

* cited by examiner

Primary Examiner—Laura K. Tso
(74) Attorney, Agent, or Firm—Rothwell, Figg, Ernst & Manbeck

(57) ABSTRACT

A lamp box with a color variable light source comprises a metal halide lamp, a bowl-like reflector, a power source, a filter and a drive motor in its body. The body of the lamp box is connected with optical fibers through a fiber optic plug. The fiber optic plug comprises a fiber optic internal sleeve, a fiber optic position sleeve, a position pole, a holder and a rear base seal sleeve. The fiber optic internal sleeve is settled inside the fiber optic position sleeve. The holder, the fiber optic position sleeve and the fiber optic internal sleeve are fastened by the position pole. Even if the fiber optic position sleeve and the optical fibers in the fiber optic internal sleeve rotate, the fiber optic plug will not depart from the body of the light source lamp box.

4 Claims, 2 Drawing Sheets

LAMP BOX WITH COLOR VARIABLE LIGHT SOURCE

Figure 1:
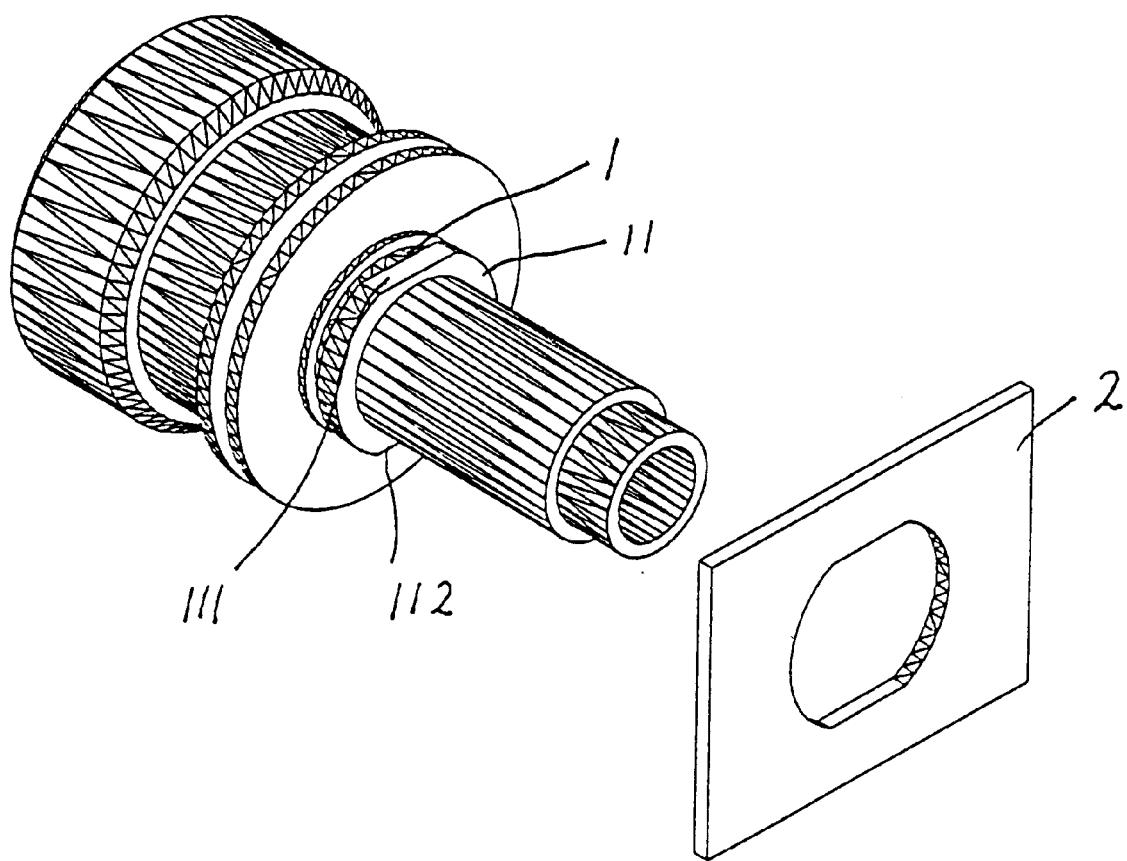

The present utility relates to an apparatus with variable illumination, in particular, relates to a lamp box having a color variable light source.

There exist a various kinds of lamp boxes for advertisement illumination. Most of the lamp boxes for advertisement illumination are provided with high voltage power sources for supplying high voltage to illuminants. For example, neon lamp is such a regular kind of advertisement lamp. A light tube of a neon lamp is used as a luminous light source. When high voltage power sources applied, neon lamps bring a lot of beauty to our life. For a part of pattern or a given pattern, light color from a neon lamp is unchangeable. Different colors from the neon lamp, as people see, are generated by different patterns. In view of the performance of the neon lamp and the configuration of the required power source, it is apparent that the neon used for advertisement must be constructed very complexly so that it can emit color variable light. As the number of variable colors increases, the configuration becomes more complex. Accordingly, Chinese Patent No. ZL97241773.7 discloses a lamp box with a color variable light source. Its light source utilizes a metal halide lamp together with a filter, optical fibers, etc., so that the light source lamp box can change its color more easily and have a simpler construction. However, such a lamp box still has the following drawback. In this configuration, optic fibers are connected with the body of the lamp box through a fiber optic plug. The fiber optic plug comprises a blocking slot. At the leading end of the blocking slot is provided a waist-shaped step with both of its top and bottom surfaces being flat. Correspondingly, a waist-shaped hole is provided on a body wall of the light source lamp box for the fiber optic plug to be inserted therein. After inserting into the waist-shaped hole, the fiber optic plug is rotated 90 degree in a clockwise or counterclockwise direction so that the body wall of the light source box is blocked into the above blocking slot and the fiber optic plug is connected with the body of the light source lamp box. Such a structure often makes the fiber optic plug depart from the body of the light source lamp box due to the rotation of optical fibers so that the light from the light source can not be directed onto the light receiving area at the end face of the optical fibers.

Therefore, the purpose of the present utility is to overcome the above-mentioned drawback in the light source lamp box, and to provide a color variable light source lamp box which connects a fiber optic plug with the body of the lamp box reliably.

To achieve the above purpose, the present utility utilizes a technical scheme in which a lamp box with a color variable light source comprises a metal halide lamp, a bowl-like reflector, a power source, a filter and a drive motor in its body. The metal halide lamp is positioned in the bowl-like reflector. The power source is connected with the metal halide lamp. The body of the lamp box is connected with optical fibers through a fiber optic plug. The filter is located between the metal halide lamp and the fiber optic plug. The drive motor drives the filter to rotate. Furthermore, the fiber optic plug comprises a fiber optic internal sleeve, a fiber optic position sleeve, a position pole, a holder and a rear base seal sleeve. Both of the foreparts of the fiber optic internal sleeve and the fiber optic position sleeve are in a straight tube shape. The fiber optic internal sleeve is settled inside the fiber optic position sleeve, and a position groove is provided at the outer edge of the fiber optic position sleeve which is located in the holder and extends from the holder. The holder has a position hole at a radial place corresponding to the position groove of the fiber optic position sleeve. The holder fastens the fiber optic position sleeve by using the position pole and a spring. The rear base seal sleeve is pivotally connected with the fiber optic position sleeve. The hole of the fiber optic jack on the body wall of the lamp box is round.

Because the fiber optic plug of the present utility comprises a fiber optic internal sleeve, a fiber optic position sleeve, a position pole, a holder and a rear base seal sleeve; the holder, the fiber optic position sleeve and the fiber optic internal sleeve are fastened by the position pole; and the fiber optic jack on the body wall of the lamp box has a round hole corresponding to the fiber optic position sleeve of the fiber optic plug, it is impossible for the fiber optic plug to depart from the body of the light source lamp box even if the fiber optic position sleeve and the optical fibers in the fiber optic internal sleeve rotate.

Figure 2:
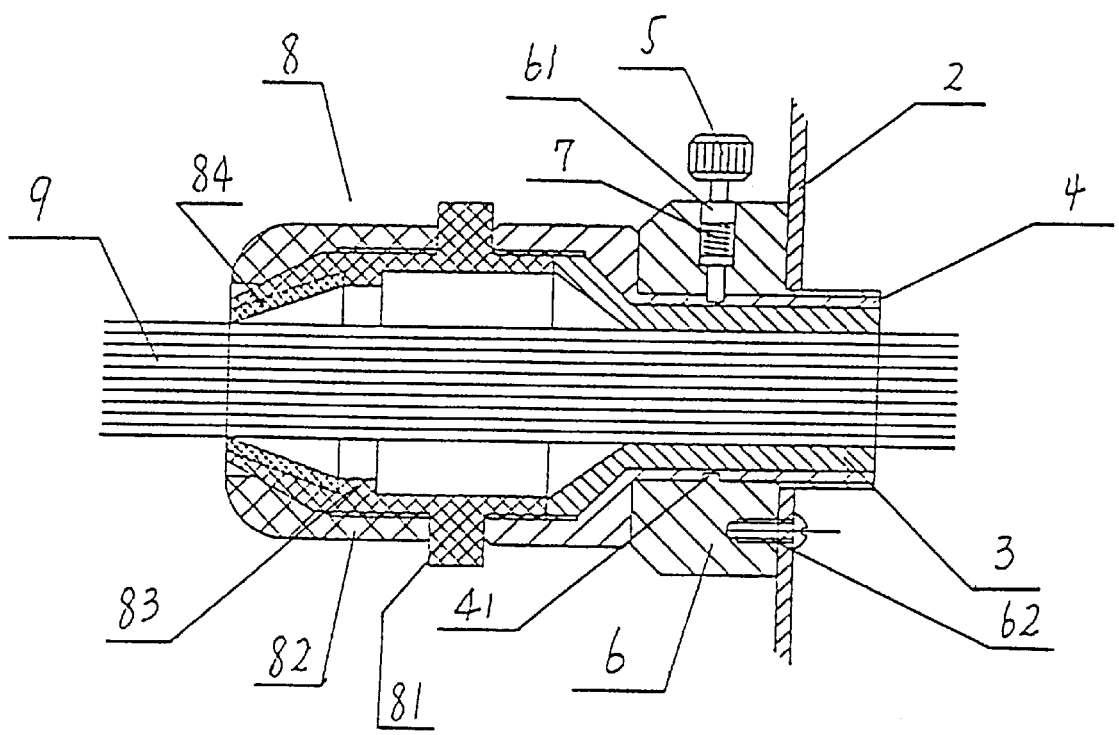

The following is the detail description on the present utility in conjunction with the accompanying drawings, in which:

FIG. 1 is an exploded schematic view of a fiber optic plug and a body wall jack of a color variable light source lamp box according to the prior art; and FIG. 2 is a schematic view of the construction of a fiber optic plug according to the present utility.

The lamp box with a color variable light source which is disclosed by Chinese Patent No. ZL97241773.7 comprises a metal halide lamp, a bowl-like reflector, a power source, a filter and a drive motor in its body. The metal halide lamp is positioned in the bowl-like reflector. The power source is connected with the metal halide lamp. The body of the lamp box is connected with optical fibers through a fiber optic plug. The optical fibers pass through the fiber optic plug. The filter is located between the metal halide lamp and the fiber optic plug. The drive motor drives the filter to rotate. The present utility provides a lamp box with its structure substantially the same as above.

First, referring to FIG. 1, the fiber optic plug of the light source lamp box comprises a blocking slot 1. At the leading end of the blocking slot 1 is provided a waist-shaped step 11 with both of its top and bottom surfaces 111, 112 being flat. Correspondingly, a waist-shaped hole is provided on a body wall 2 of the light source lamp box for the fiber optic plug to be inserted therein. After inserting into the waist-shaped hole, the fiber optic plug is rotated 90 degree in a clockwise or counterclockwise direction so that the body wall 2 of the light source lamp box is blocked into the above blocking slot 1 and the fiber optic plug is connected with the body of the light source lamp box. As mentioned above, such a structure often makes the fiber optic plug depart from the body of the light source lamp box due to the rotation of optical fibers so that the light from the light source can not be emitted.

Then, referring to FIG. 2, the fiber optic plug of the present utility comprises a fiber optic internal sleeve 3, a fiber optic position sleeve 4, a position pole 5, a holder 6 and a rear base seal sleeve 8. Both of the foreparts of the fiber optic internal sleeve and the fiber optic position sleeve are in a straight tube shape. The fiber optic internal sleeve 3 is settled inside the fiber optic position sleeve 4, and a position groove is provided at the outer edge of the fiber optic position sleeve 4 which is located in the holder 6 and extends from the holder 6. The holder 6 has a position hole 61 at a radial place corresponding to the position groove 41 of the fiber optic position sleeve 4. The holder 6 fastens the fiber optic position sleeve by using the position pole and a spring. When the fiber optic position sleeve 4 is inserted into the body of the light source box 2, the holder 6 has its leading edge contacted with the body wall 2 of the light source box tightly, and its trailing edge with the fiber optic position sleeve 4. By screwing the position pole 5, the fiber optic plug is impossible to depart from the body of the light source box, no matter how do the optical fibers or the fiber optic internal sleeve 3 rotate. Alternatively, the holder 6 of the fiber optic plug may be fastened to the body wall 2 by tightening a binding bolt. The rear base seal sleeve 8 is pivotally connected with the fiber optic position sleeve 4. The hole of the fiber optic jack on the body wall 2 of the lamp box is also round.

Furthermore, the internal diameter of the fiber optic internal sleeve 3 can be adjusted based on the thickness of the optical fibers. If the optical fibers 9 are think, the internal diameter of the fiber optic internal sleeve 3 is large, and vice versa.

The rearpart of the fiber optic position sleeve 4 has a horn-shaped cavity. The rear base seal sleeve 8 comprises a seal internal sleeve 81 and a seal external sleeve 82 being placed outside the seal internal sleeve 81. The two seal sleeves are connected threadly and their rearparts are in a reversed horn shape. A seal washer 84 is provided in the reversed horn of the seal internal sleeve 81 with one end contacting with a step 83. The seal washer 84 can be used to prevent the rain water from flowing into the fiber optic plug along the optic fibers effectively.

What is claimed is:

1. A lamp box with a color variable light source, comprising a metal halide lamp, a bowl-like reflector, a power source, a filter, and a drive motor, said metal halide lamp being positioned in said bowl-like reflector, said power source being connected with said metal halide lamp, said body of said lamp box being connected with optical fibers through a fiber optic plug, said filter being located said metal halide lamp and said fiber optic plug, wherein:

said fiber optic plug comprises a fiber optic internal sleeve, a fiber optic position sleeve, a position pole, a holder, and a rear base seal sleeve, both of the foreparts of said fiber optic internal sleeve and said fiber optic position sleeve are in a straight tube shape, said fiber optic internal sleeve is settled inside said fiber optic position sleeve;

a position groove is provided at the outer edge of said fiber optic position sleeve which is located in said holder and extends from said holder, said holder has a position hole at a radial place corresponding to said position groove of said fiber optic position sleeve, the holder fastens said fiber optic position sleeve by using said position pole and a spring;

said rear base seal sleeve is pivotally connected with said fiber optic position sleeve; and said hole of said fiber optic jack on the body wall of the lamp box is round.

2. The lamp box of claim 1, said holder is fastened to the body wall of said lamp box by tightening a binding bolt.

3. The lamp box of claim 1, wherein the rearpart of said fiber optic position sleeve has a horn-shaped cavity, said rear base seal sleeve comprises a seal internal sleeve and a seal external sleeve being placed outside said seal internal sleeve, the rearparts of said two seal sleeves are in a reversed horn shape.

4. The lamp box of claim 3, wherein a step is provided in said seal internal sleeve, a seal washer is provided in the reversed horn of said seal internal sleeve with one end contacting with said step.

\* \* \* \* \*